United States Patent Office 2,841,484
Patented July 1, 1958

2,841,484

BIOLOGICAL TOXICANTS COMPRISING HEXA-HALOBICYCLOHEPTENOLS AND ESTERS THEREOF

William K. Johnson, Dayton, Ohio, assignor to Monsanto Chemical Company, St. Louis, Mo., a corporation of Delaware No Drawing. Application May 5, 1955
Serial No. 506,372

25 Claims. (Cl. 71—2.3)

This invention relates to hexahalobicycloheptenols and their esters, to methods of preparing these compounds, and to their use as biological toxicants.

The present compounds may be represented by the formula

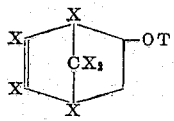

where T is selected from the class consisting of hydrogen, aryl- and alkyl-hydrocarboncarbonyl radicals, and hydrocarboncarbamyl radicals, and X is halogen.

The compounds of the above formula where T is a hydrocarboncarbonyl group are readily prepared by the Diels-Alder reaction of a hexahalocyclopentadiene with a vinyl ester of a hydrocarboncarboxylic acid. By hydrolysis of such an ester adduct, the bicycloheptenol is prepared, of the above formula where T is hydrogen. By reaction of the bicycloheptenol with isocyanates or with dialkylcarbamyl halides, there may be prepared bicycloheptenol carbamates, where T is a hydrocarboncarbamyl radical in the above formula.

The preparation of all of these new compounds is detailed further hereinbelow. These new compounds are potent biological toxicants, and are particularly effective herbicides and fungicides, as well as possessing physical and chemical characteristics which give them utility for manifold applications in the chemical and allied industries.

By the Diels-Alder addition of a vinyl ester of a carboxylic acid to a hexahalocyclopentadiene, there are provided bicycloheptenyl esters of carboxylic acids. The reaction may be represented schematically as follows:

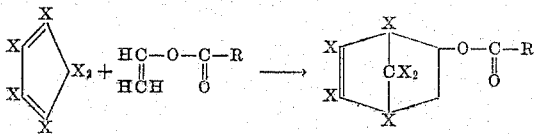

where X is halogen and R is an alkyl, cycloalkyl, aralkyl, or aryl radical of from 1 to 20 carbon atoms. Examples of suitable hexahalocyclopentadienes useful for this reaction are hexabromocyclopentadiene, hexachlorocyclopentadiene, tetrachlorodifluorocyclopentadiene, bromopentachlorocyclopentadiene, etc.

The vinyl esters of carboxylic acids useful in the above reaction may be prepared, e. g., by heating an ethylene dihalide with an alkali metal salt of a carboxylic acid, or by catalytic addition of acetylene to a carboxylic acid. Suitable vinyl esters for the present reaction include the esters of lower alkanoic acids, such as vinyl acetate, vinyl propionate, vinyl butyrate, vinyl isobutyrate, vinyl valerate, vinyl isovalerate, vinyl pivalate, vinyl hexanoate, etc. Also capable of undergoing the Diels-Alder addition to hexahalocyclopentadienes are the branched and straight-chain higher fatty acid vinyl esters, such as vinyl 2-ethyl-hexanoate, vinyl nonanoate, vinyl decanoate, vinyl dodecanoate, vinyl tetradecanoate, vinyl hexadecanoate, vinyl heptadecanoate, vinyl octadecanoate, etc. The vinyl esters of carbocyclic carboxylic acids are also useful in the present process, i. e., the vinyl esters of aromatic acids such as vinyl benzoate, vinyl o-, m-, and p-toluate, the vinyl esters of the dimethylbenzoic acids, vinyl dodecylbenzoate, vinyl 1- and 2-naphthoate, etc.; the vinyl esters of araliphatic acids such as vinyl phenylacetate, vinyl tolylacetate, vinyl 3-phenylpropionate, vinyl 2-naphthylbutyrate, etc.; and vinyl esters of cycloaliphatic acids such as vinyl cyclohexanecarboxylate, etc.

The present invention provides, e. g., lower alkanoic acid esters such as:

1,4,5,6,7,7-hexachlorobicyclo[2.2.1]-5-hepten-2-yl acetate,
1,4,5,6,7,7-hexachlorobicyclo[2.2.1]-5-hepten-2-yl propionate,
1,4,5,6,7,7 - hexachlorobicyclo[2.2.1]-5-hepten-2-yl isobutylrate,
1,4,5,6,7,7 - hexachlorobicyclo[2.2.1]-5-hepten-2-yl valerate,
1,4,5,6,7,7-hexachlorobicyclo[2.2.1]-5-hepten-2-yl isovalerate,
1,4,5,6,7,7-hexabromobicyclo[2.2.1]-5-hepten-2-yl isopropionate,
1,4,5,6,7,7-hexabromobicyclo[2.2.1]-5-hepten-2-yl butyrate,
1,4,5,6,7,7-hexabromobicyclo[2.2.1]-5-hepten-2-yl hexanoate,
1,4,5,6-tetrachloro - 7,7 - difluorobicyclo[2.2.1]-5-hepten-2-yl acetate,
1,4,5,6-tetrachloro - 7,7 - difluorobicyclo[2.2.1]-5-hepten-2-yl propionate,
1,4,5,6-tetrachloro - 7,7 - difluorobicyclo[2.2.1]-5-hepten-2-yl butyrate,
1,4,5,6-tetrachloro - 7,7 - difluorobicyclo[2.2.1]-5-hepten-2-yl valerate,
1,4,5,6-tetrachloro - 7,7 - difluorobicyclo[2.2.1]-5-hepten-2-yl pivalate,
1,4,5,6-tetrachloro - 7,7 - difluorobicyclo[2.2.1]-5-hepten-2-yl isohexanoate, etc.;

Higher fatty acid esters such as:

1,4,5,6,7,7-hexachlorobicyclo[2.2.1]-5-hepten-2-yl 2-ethylhexanoate,
1,4,5,6,7,7-hexachlorobicyclo[2.2.1]-5-hepten-2-yl nonanoate,
1,4,5,6,7,7-hexachlorobicyclo[2.2.1]-5-hepten-2-yl dodecanoate,
1,4,5,6,7,7-hexachlorobicyclo[2.2.1]-5-hepten-2-yl tetradecanoate,
1,4,5,6,7,7-hexachlorobicyclo[2.2.1]-5-hepten-2-yl hexadecanoate,
1,4,5,6,7,7-hexachlorobicyclo[2.2.1]-5-hepten-2-yl octadecanoate,
1,4,5,6,7,7-hexabromobicyclo[2.2.1]-5-hepten-2-yl nonanoate,
1,4,5,6,7,7-hexabromobicyclo[2.2.1]-5-hepten-2-yl decanoate,
1,4,5,6,7,7-hexabromobicyclo[2.2.1]-5-hepten-2-yl hexadecanoate,
1,4,5,6,7,7-hexabromobicyclo[2.2.1]-5-hepten-2-yl heptadecanoate,
1,4,5,6-tetrachloro - 7,7 - difluorobicyclo[2.2.1]-5-hepten-2-yl 2-ethylhexanoate,
1,4,5,6-tetrachloro - 7,7 - difluorobicyclo[2.2.1]-5-hepten-2-yl dodecanoate,
1,4,5,6-tetrachloro - 7,7 - difluorobicyclo[2.2.1]-5-hepten-2-yl hexadecanoate,
1,4,5,6-tetrachloro - 7,7 - difluorobicyclo[2.2.1]-5-hepten-2-yl octadecanoate, etc.;

And carbocyclic carboxylic acid esters such as:

1,4,5,6,7,7-hexachlorobicyclo[2.2.1]-5-hepten-2-yl benzoate,
1,4,5,6,7,7-hexachlorobicyclo[2.2.1]-5-hepten-2-yl 1-naphthoate,
1,4,5,6,7,7-hexachlorobicyclo[2.2.1]-5-hepten-2-yl p-toluate,
1,4,5,6,7,7-hexachlorobicyclo[2.2.1]-5-hepten-2-yl cyclohexanecarboxylate.
1,4,5,6,7,7-hexachlorobicyclo[2.2.1]-5-hepten-2-yl 2,4-dimethylbenzoate,
1,4,5,6,7,7-hexabromobicyclo[2.2.1]-5-hepten-2-yl benzoate,
1,4,5,6,7,7-hexabromobicyclo[2.2.1]-5-hepten-2-yl o-toluate,
1,4,5,6,7,7-hexabromobicyclo[2.2.1]-5-hepten-2-yl ar-dodecylbenzoate,
1,4,5,6-tetrachloro-7,7-difluorobicyclo[2.2.1]-5-hepten-2-yl m-toluate,
1,4,5,6-tetrachloro-7,7-difluorobicyclo[2.2.1]-5-hepten-2-yl 2-naphthoate,
1,4,5,6-tetrachloro-7,7-difluorobicyclo[2.2.1]-5-hepten-2-yl 2-(tetrahydronaphthoate),
1,4,5,6-tetrachloro-7,7-difluorobicyclo[2.2.1]-5-hepten-2-yl 3-phenylpropionate, etc.

The present bicycloheptenol esters are readily prepared by simply contacting a vinyl ester of a carboxylic acid with a hexahalocyclopentadiene. No catalyst is usually necessary, though catalysts may be employed if desired. Elevated temperatures are conveniently employed to accelerate the reaction, but the temperature of the reaction mixture is not critical and may be selected at any desired level which produces the desired rate of reaction without causing decomposition of the reaction mixture components. The reflux temperature of the reaction mixture may conveniently be employed, for example. Ordinary, sub- or super-atmospheric pressures may be applied; it has been found that superatmospheric pressures, i. e., the autogenous pressures of the reactants, are usefully employed, for example, when operating with the low-boiling carboxylic acid vinyl esters, so as to reach elevated temperatures convenient for rapid completion of the reaction without loss of reactants. With the higher fatty acid and carbocyclic acid esters, ordinary or sub-atmospheric pressures may be aptly used. Solvents or diluents may be used or not, as desired; suitable solvents are, e. g., aromatic compounds such as benzene, toluene or xylene, aliphatic solvents such as hexane, cyclohexane, or petroleum naphthenes, chlorinated compounds such as ethylene dichloride, oxygenated compounds such as dioxane, etc. The hexahalocyclopentadiene and the vinyl ester of the carboxylic acid may be present in equimolecular amounts in the reaction mixture, as required by the stoichiometry of the reaction, or an excess of the more readily available component may be used, since unreacted material is readily separated on completion of the reaction.

The present hexahalobicycloheptenol esters are well-defined, stable products which range from liquids to solid crystalline materials. They are useful for a variety of industrial and agricultural purposes; for example, the bicycloheptenol esters of lower carboxylic acids may be used, e. g., as dielectrics; the higher fatty acid esters may be used as flame-proofing plasticizers; the cyclic acid esters may be used as functional fluids, etc. All of these compounds may be used as biological toxicants, and they are particularly effective, for example, as herbicides and fungicides.

The preparation of the present esters is further illustrated, but not limited, by the following examples:

Example 1

A solution of 218.4 g. (0.8 mole) of hexachlorocyclopentadiene and 62.6 g. (0.73 mole) of vinyl acetate in 100 ml. of toluene was heated to 160° C. in a 1-liter rocking autoclave for five hours. After the reaction products had cooled, unreacted hexachlorocyclopentadiene was distilled off, and a fraction boiling at 140–144° C. at 3.5 mm. with $n_D^{25}$ 1.5348, was separated. On standing, this fraction solidified; it weighed 155 g. and analyzed as follows:

|  | Found | Calculated for $C_9H_8Cl_6O_2$ |
| --- | --- | --- |
| Percent C | 30.15 | 30.09 |
| Percent H | 1.65 | 1.69 |
| Percent Cl | 57.91 | 60.63 |

The product was thus the desired 1,4,5,6,7,7-hexachlorobicyclo[2.2.1]-5-hepten-2-yl acetate, M. 38.–42° C.

Example 2

A mixture of 218.4 g. (0.8 mole) hexachlorocyclopentadiene and 86 g. (1.0 mole) of vinyl acetate was charged to an autoclave and gradually heated to 120° C. The temperature within the autoclave continued to rise, to a maximum of 155° C., after external heating had ceased; the mixture was maintained at 145° C. for six hours thereafter, and then let cool. After removal of 23 g. of unreacted hexachlorocyclopentadiene, 240 g., a yield of 93 percent based on hexachlorocyclopentadiene converted, of the 1,4,5,6,7,7-hexachlorobicyclo[2.2.1]-5-hepten-2-yl acetate was isolated.

Example 3

A mixture of 41 g. of (0.15 mole) of hexachlorocyclopentadiene and 18.4 g. (0.1 mole) of vinyl nonanoate was placed in a flask and heated to 150–180° C. for six hours. After removal of 10 g. of unreacted hexachlorocyclopentadiene, there were obtained 40 g. of 1,4,5,6,7,7-hexachlorobicyclo[2.2.1]-5-hepten-2-yl nonanoate, B. 164–168° C./0.3 mm., $n_D^{25}$ 1.5070, analyzing as follows:

|  | Found | Calculated for $C_{16}H_{20}Cl_6O_2$ |
| --- | --- | --- |
| Percent C | 42.08 | 42.05 |
| Percent H | 4.40 | 4.41 |
| Percent Cl | 45.91 | 46.42 |

Example 4

Similarly, hexachlorocyclopentadiene may be reacted with vinyl 2-ethylhexanoate to give 1,4,5,6,7,7-hexachlorobicyclo[2.2.1]-5-hepten-2-yl 2-ethylhexanoate, which is a limpid, amber liquid, B. 170–175° C./2.5 mm., $n_D^{25}$ 1.5080.

Example 5

A mixture of 27.3 g. (0.1 mole) of hexachlorocyclopentadiene and 14.8 g. (0.1 mole) of vinyl benzoate was heated to 160–180° C. for two hours. By distillation there were isolated 30 g. of 1,4,5,6,7,7-hexachlorobicyclo[2.2.1]-5-hepten-2-yl benzoate, B. 160–163° C./0.2 mm., M. 83–85°C., analyzing as follows:

|  | Found | Calculated for $C_{14}H_8Cl_6O_2$ |
| --- | --- | --- |
| Percent C | 40.28 | 39.96 |
| Percent H | 2.21 | 1.92 |
| Percent Cl | 48.39 | 50.52 |

By hydrolysis of bicycloheptenol esters prepared by Diels-Alder addition of a halocyclopentadiene and a vinyl ester as described above, the hydroxyl group is set free and the heptenyl alcohol may be isolated. The hydrolysis may be accomplished by standard hydrolysis catalysts, i. e., mineral acids, such as sulfuric acid; however, it has been found that the heptenol can be particularly readily isolated in very good yields by alcoholysis of the heptenol ester with a lower alkyl alcohol. This reaction takes place in accordance with the following reaction equation:

$$RCOOR' + R''OH \rightleftharpoons RCOOR'' + R'OH$$

It is catalyzed by esterification catalysts, such as dry hydrogen chloride, but also goes, though more slowly, even in the absence of such catalysts. The reaction proceeds at ordinary, sub- or superatmospheric pressures, and at temperatures ranging from ambient room temperatures up to the distillation temperatures of the reaction mixtures. Equimolecular amounts of the heptenol ester and the lower alkyl alcohol are required by the stoichiometry of the transesterification reaction, as shown above; it may be convenient, however, to use an excess of the lower alcohol, since the unreacted lower alkyl alcohol is readily removed from the product. The catalyst, i. e., dry hydrogen chloride, need be present in only small amount, such as from 1 to 15 percent by weight of the bicycloheptenol ester. Conveniently, the ester of the lower alkyl alcohol formed by the alcoholysis is slowly removed, e. g., by distillation, until the reaction is completed. The procedure is further illustrated by the following example:

Example 6

Dry gaseous hydrogen chloride was passed into 250 ml. of ethanol until four grams of the hydrogen chloride was absorbed; 35.9 g. of the 1,4,5,6,7,7-hexachlorobicyclo[2.2.1]-5-hepten-2-yl acetate of Example 2 were added, and the mixture was heated to reflux temperature, whereupon an azeotrope of ethyl acetate and ethanol was slowly removed by distillation. The residual solid was recrystallized twice from hexane, giving 27 g. of the desired 1,4,5,6,7,7-hexachlorocyclobicyclo[2.2.1]-5-heptenol, M. 149–151° C., which analyzed as follows:

|  | Found | Calculated for $C_7H_4Cl_6O$ |
| --- | --- | --- |
| Percent C | 26.60 | 26.54 |
| Percent H | 1.40 | 1.27 |
| Percent Cl | 66.47 | 67.13 |

Example 7

The procedure described above was repeated, reacting 359 g. of the product of Example 2 with 1000 ml. of ethanol in the presence of 5 g. of dry hydrogen chloride. At the end of the reaction, vacuum distillation was applied to remove the last traces of ethanol, and the product was crystallized from toluene. Yield, 295 g.

By alcoholysis, carried out as described above, there may be obtained 1,4,5,6,7,7-hexachlorobicyclo[2.2.1]-5-hepten-2-ol, 1,4,5,6,7,7-hexabromobicyclo[2.2.1]-5-hepten-2-ol, 1,4,5-6-tetrachloro-7,7-difluorobicyclo[2.2.1]-5-hepten-2-ol, etc. These cyclic alcohols are reactive compounds, useful for chemical synthesis, as described below; they are also potent biological toxicants, and are particularly effective harbicides.

In addition to hexahalobicycloheptenols and the carboxylic acid esters of hexahalobicycloheptenols, this invention also contemplates the carbamic acid esters of the present heptenols. Carbamate esters may be prepared by reaction of the bicycloheptyl alcohol with an isocyanate, which gives a monohydrocarboncarbamic acid ester, as represented by the following equation:

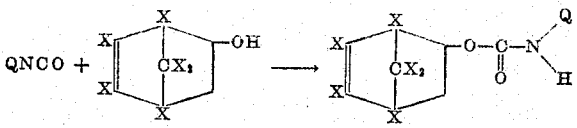

where QNCO is any isocyanate, X is halogen, and Q is a hydrocarbon radical, or by reaction of a dihydrocarboncarbamyl halide with the bicycloheptyl alcohol, to give a dihydrocarboncarbamate, as represented by the following equation:

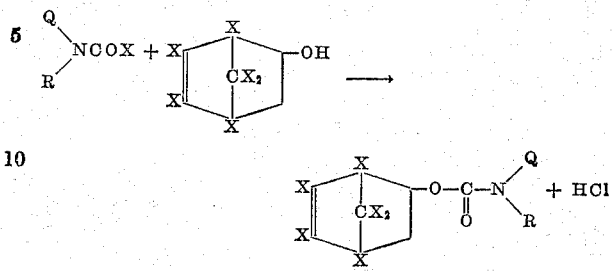

where

is any N-disubstituted carbamyl halide, X is halogen and Q and R are hydrocarbon radicals. The present carbamates derived from either an isocyanate or a disubstituted carbamyl halide can then be represented generally by the formula

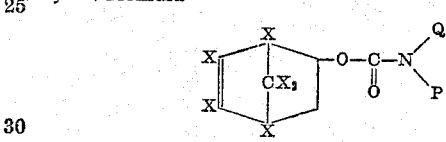

where X is halogen, Q is a hydrocarbon radical, and P is selected from the class consisting of hydrogen and hydrocarbon radicals.

Examples of suitable isocyanates for use in preparing the present carbamates are methyl isocyanate, ethyl isocyanate, hexyl isocyanate, phenyl isocyanate, etc. Suitable N-disubstituted carbamyl halides which may be used to prepare the present carbamates are, e. g., dimethylcarbamyl chloride, dipropylcarbamyl chloride, dipentylcarbamyl bromide, etc.

By reaction of the present hexahalobicycloheptenols with isocyanates, there may be prepared, e. g., 1,4,5,6,7,7-hexachlorobicyclo[2.2.1]-5-hepten-2-yl carbanilate,
1,4,5,6,7,7-hexachlorobicyclo[2.2.1]-5-hepten-2-yl methylcarbamate,
1,4,5,6,7,7-hexachlorobicyclo[2.2.1]-5-hepten-2-yl ethylcarbamate,
1,4,5,6,7,7-hexachlorobicyclo[2.2.1]-5-hepten-2-yl hexylcarbamate,
1,4,5,6,7,7-hexachlorobicyclo[2.2.1]-5-hepten-2-yl octadecylcarbamate,
1,4,5,6,7,7-hexachlorobicyclo[2.2.1]-5-hepten-2-yl tolylcarbamate,
1,4,5,6 - tetrachloro - 7,7 - difluorobicyclo[2.2.1] - 5-hepten-2-yl carbanilate,
1,4,5,6 - tetrachloro - 7,7 - difluorobicyclo[2.2.1] - 5-hepten-2-yl methylcarbamate,
1,4,5,6-tetrachloro - 7,7 - difluorobicyclo[2.2.1] - 5 - hepten-2-yl octadecylcarbamate,
1,4,5,6 - tetrachloro - 7,7 - difluorobicyclo[2.2.1] - 5-hepten-2-yl p-nitrophenylcarbamate,
1,4,5,6,7,7 - hexabromobicyclo[2,2,1] - 5 - hepten - 2-yl carbanilate,
1,4,5,6,7,7 - hexabromobicyclo[2.2.1] - 5 - hepten - 2 - yl ethylcarbamate,
1,4,5,6,7,7 - hexabromobicyclo[2.2.1] - 5 - hepten - 2 - yl octadecylcarbamate, etc.

By reaction of the heptenols of the present invention with dihydrocarboncarbamyl halides, there may be prepared, e. g., 1,4,5,6,7,7 - hexachlorobicyclo[2.2.1] - 5 - hepten - 2 - yl dimethylcarbamate, 1,4,5,6,7,7 - hexachlorobicyclo[2.2.1] - 5 - hepten - 2 - yl dipropylcarbamate, 1,4,5,6,7,7 - hexabromobicyclo[2.2.1] - 5 - hepten - 2 - yl diphenylcarbamate, 1,4,5,6,7,7 - hexabromobicyclo[2.2.1] - 5 - hepten - 2 - yl dinonylcarbamate, 1,4,5,6 - tetrachloro - 7,7 - difluorobicyclo[2.2.1] - 5 - hepten-2-yl dimethylcarbamate, etc.

Reaction of the heptenols of the present invention with diisocyanates may give compounds containing a reactive isocyanate group which may then undergo further reaction, e. g.

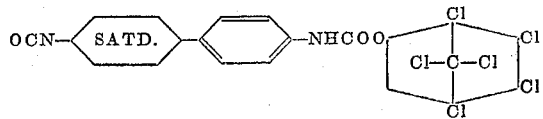

1,45,6,7,7-hexachlorobicyclo[2.2.1]-5-hepten-2-yl 4-(4'-isocyanocyclohexyl)phenylcarbamate.

The present carbamates are prepared by simply contacting the heptenol and the isocyanate or carbamyl halide. The reaction proceeds at from room temperature up to the reflux temperature of the mixture. Ordinary atmospheric, sub- or super-atmospheric pressures may be used as desired. A catalyst such as aluminum chloride may be used with less reactive compounds, but is generally not necessary. Solvents or diluents are not essential but may be convenient; as solvents may be used, e. g., hexane, benzene, dichloropropane, isobutyl acetate, etc. The reactants may be present in equimolecular amounts, or an excess of the more readily available component may be used, unreacted material being removed at the end of the reaction. The procedure is illustrated by the following example:

*Example 8*

A mixture of 31.6 g. (0.1 mole) of 1,4,5,6,7,7-hexachlorobicyclo[2.2.1]-5-hepten-2-ol, 11.9 g. (0.1 mole) of phenyl isocyanate, and 150 ml. of dry toluene was refluxed for 3 hours; then the toluene was removed by vacuum distillation, and the solid residue was recrystallized from aqueous 80 percent ethanol. The product, 1,4,5,6,7,7 - hexachlorobicyclo[2.2.1] - 5 - hepten-2-yl carbanilate, weighed 20 g., melted at 120–122° C., and analyzed as follows:

|  | Found | Calculated for $C_{14}H_9Cl_6NO_2$ |
|---|---|---|
| Percent C | 39.09 | 38.56 |
| Percent H | 2.42 | 2.08 |
| Percent Cl | 47.41 | 47.78 |
| Percent N | 3.46 | 3.21 |

*Example 9*

Similarly, on refluxing a solution of 0.1 mole of dimethylcarbamyl chloride with 0.1 mole of 1,4,5,6,7,7-hexabromobicyclo[2.2.1]-5-hepten-2-ol in benzene for several hours, there is obtained 1,4,5,6,7,7-hexabromobicyclo[2.2.1]-5-hepten-2-yl dimethylcarbamate.

The present carbamates are stable, generally solid, crystalline products. They may be used, e. g., as rubber chemicals, as chemical intermediates, and as toxicants, i. e., as fungicides and as herbicides.

It will be evident to those skilled in the art that all of the present compounds are susceptible of existing in several stereo-chemical configurations, i. e., two enantiomers of the exo and two enantiomers of the endo configuration. It is not presently proven which of these various configurations is produced in the present reactions, or indeed, whether racemization does not take place under the conditions of the reactions, producing mixtures of the different possible isomers. The scope of the present invention is therefore intended to be limited only by the unambiguous planar formulae of the present compounds, as illustrated above, and to include all of the possible sterochemical configurations thereof.

The present compounds are distinguished particularly by their biological toxicities, and especially herbicidal and fungicidal effects.

For example, nearly complete systemic suppression of tomato wilt, a disease caused by the fungus, *Fusarium oxysporum f. lycopersici*, was obtained by application of respective 100 parts per million concentrations of 1,4,5,6,7,7-hexachlorobicyclo[2.2.1]-5-hepten-2-yl carbanilate and 1,4,5,6,7,7-hexachlorobicyclo[2.2.1]-5-hepten-2-yl 2-ethylhexoate to the roots of tomato plants exposed to this fungus, whereas control plants similarly exposed to the Fusarium fungus, but not protected by application of one of these chemicals, became severely diseased under the same conditions. Similarly, at the very low rate of 10 p. p. m., respective applications of 1,4,5,6,7,7-hexachlorobicyclo[2.2.1]-5-hepten-2-yl carbanilate and of 1,4,5,6,7,7-hexachlorobicyclo[2.2.1]-5-hepten-2-yl nonanoate gave substantial control of Fusarium infection in tomato plants, without exhibiting phytotoxic effects.

The present compounds are also very useful pre-emergent and contact herbicides, as illustrated by the following examples:

*Example 10*

Two parts of top soil screened through ¼" mesh were mixed with one part of sand, and this mixture was placed in a flat pan. Over one-third of the surface of the soil, grass and corn seeds were scattered; seeds of broad-leaf plants were randomly spread over the remaining two-thirds of the surface. The seeds were then covered with a ⅜" layer of soil, and the pan was sprayed with an aqueous solution of a fertilizer and an insecticide. An acetone solution of 1,4,5,6,7,7-hexachlorobicyclo[2.2.1]-5-hepten-2-ol was then sprayed over the pan at a rate equivalent to 25 pounds per acre. After spraying, the pan was placed in water and allowed to absorb moisture through the perforated bottom until the soil surface was completely moist; it was then kept under standard conditions of moisture and sunlight for ten days in a greenhouse. On observation, it was found that considerable suppression of the germination of many of the plants had occurred; of the plants which had emerged, both grasses and broad-leaf plants were severely crippled and exhibited striking abnormalities in growth.

*Example 11*

Pan flats containing healthy ten-day old seedlings of narrow- and broad-leaf plants, and bean plants (black valentine) having one mature trifoliate and one partially opened trifoliate were sprayed with acetone solutions of the 1,4,5,6,7,7,-hexacholorbicyclo-[2.2.1]-5-hepten-2-ol of Example 6, and with the 1,4,5,6,7,7-hexachlorobicyclo-[2.2.1]-5-hepten-2-yl acetate of Example 1. After ten days in a greenhouse bench under standard conditions of sunlight and moisture the plants were observed.

Applied at a rate equivalent to 9 pounds per acre, the hexachlorobicyclo[2.2.1]-5-hepten-2-ol severely damaged the seedlings in the test pan, and the bean plant sprayed at this rate was found to exhibit damage to the plant and abnormalities in the growth of new leaves. At the reduced rate of 3½ lbs./acre, the heptenol also had severe to fatal phytotoxic effects on seedlings of both broad- and narrow-leaf plant species. Even at a rate of less than one pound per acre, its phytotoxic effects were evident, showing the very potent herbicidal effects of the present compounds. Similarly, the acetate of the diol produced complete kill of corn plants, for example, after a single application of the compounds at the rate of 9 pounds per acre.

The physiological effects of the present compounds will depend on the rate of application. In herbicidal applications, for example, rates of 2-3 pounds of active toxicant per acre may be effective; higher or lower rates may be used, depending on the plant species to be eradicated and on the particular compound of the types listed hereinabove which is applied. Very low rates per acre may produce formative, hormonal effects.

The forms in which the present compounds are applied as herbicides include solutions, emulsions or dusts. The compounds may also be mixed with surfacing materials, such as cinders, to assist in the suppression of any vegetative growth in areas such as railroad lines, parking area, etc. For application as herbicidal dusts, the present compounds may be mixed with a carrier such as talc, pumice, etc. To apply the compounds of the invention to the foliage of undesired vegetation, it is especially convenient to spray the plants to be eradicated with a liquid, i. e., a solution of the compound in an oil such as kerosene, or in the form of an emulsion.

Emulsions of the present compounds are prepared by dissolving the compound in a small amount of an oil, i. e., a water-insoluble organic solvent such as petroleum or tar oil, and adding to this an emulsifying agent and then water, to produce an oil-in-water emulsion. The emulsifying agents useful include surface-active agents such as long-chain alcohols, e. g., 9-octadecen-1-ol, sulfates and sulfonates, e. g., sodium lauryl sulfate, sodium dioctyl sulfosuccinate and sodium dodecylbenzenesulfonate, polyoxyalkylene compounds, etc. The emulsions may be prepared, e. g., containing, in parts by weight:

| | Parts |
|---|---|
| Water | 996 |
| Emulsifier | 1 |
| Oil | 2 |
| Bicycloheptene compound | 1 |

The media to be used for systemic protection of growing plants against fungi such as the organism causing tomato wilt are similar, i. e., dusts, emulsions, or solutions, but the concentrations applied will generally be lower, i. e., below 1 pound per acre, applied to the soil.

While specific examples of preferred embodiments of the invention have been given above, it will be appreciated that various modifications may be made of the details given herein without departing from the invention.

What is claimed is:

1. A compound of the formula

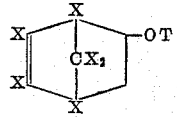

where X is halogen and T is selected from the group consisting of hydrogen, hydrocarboncarbonyl radicals, and hydrocarbamyl radicals.

2. An ester of the formula

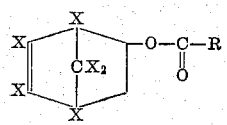

where X is halogen and R is a hydrocarbon radical of from 1 to 20 carbon atoms.

3. A bicycloheptenol of the formula

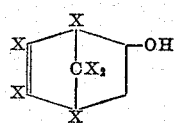

where X is halogen.

4. A compound of the formula

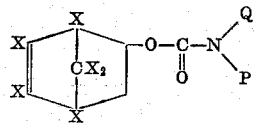

where X is halogen, Q is a hydrocarbon radical, and P is selected from the class consisting of hydrogen and hydrocarbon radicals.

5. 1,4,5,6,7,7-hexachlorobicyclo[2.2.1]-5-hepten-2-ol, of the formula

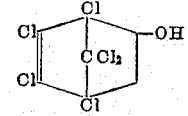

6. 1,4,5,6,7,7 - hexachlorobicyclo[2.2.1] - 5 - hepten-2 - yl acetate.

7. 1,4,5,6,7,7 - hexachlorobicyclo[2.2.1] - 5 - hepten-2 - yl nonanoate.

8. 1,4,5,6,7,7 - hexachlorobicyclo[2.2.1] - 5 - hepten-2 - yl benzoate.

9. 1,4,5,6,7,7 - hexachlorobicyclo[2.2.1] - 5 - hepten-2 - yl carbanilate.

10. The method which comprises the steps of preparing a carboxylic acid ester of a hexahalobicyclo[2.2.1]-5-hepten-2-ol of the formula

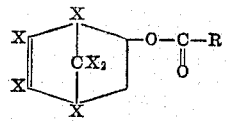

where X is halogen and R is a hydrocarbon radical of from 1 to 20 carbon atoms by contacting a hexahalocyclopentadiene with a vinyl ester of a carboxylic acid of the formula $RCOOCH=CH_2$ where R is as hereinbefore defined, forming and isolating the free hexahalobicyclo[2.2.1]-5-hepten-2-ol, contacting the said hexahalobicyclo[2.2.1]-5-hepten-2-ol with a compound selected from the group consisting of hydrocarbon isocyanates and dihydrocarboncarbamyl halides, and isolating from the reaction product a compound of the formula

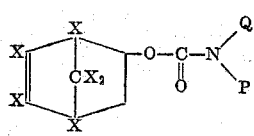

where X is halogen, Q is a hydrocarbon radical, and P is selected from the class consisting of hydrogen and hydrocarbon radicals.

11. The method which comprises preparing 1,4,5,6,7,7-hexachlorobicyclo[2.2.1]-5-hepten-2-yl acetate by contacting hexachlorocyclopentadiene with vinyl acetate; alcoholyzing the said 1,4,5,6,7,7-hexachlorobicyclo[2.2.1]-5-hepten-2-yl acetate with ethyl alcohol in the presence of hydrogen chloride, isolating from the reaction product 1,4,5,6,7,7 - hexachlorobicyclo[2.2.1] - 5 - hepten - 2 - ol, contacting the said 1,4,5,6,7,7 - hexachlorobicyclo[2.2.1]-5-hepten-2-ol, with phenyl isocyanate, and isolating from the reaction product 1,4,5,6,7,7-hexachlorobicyclo[2.2.1]-5-hepten-2-yl carbanilate.

12. The method which comprises contacting a hexahalocyclopentadiene with a vinyl ester of a carboxylic acid of the formula

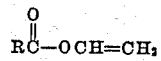

where R is a hydrocarbon radical of from 1 to 20 carbon atoms, and isolating from the reaction product a compound of the formula

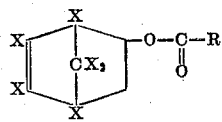

where X is halogen and R is as hereinbefore defined.

13. The method which comprises contacting a hexahalobicyclo[2.2.1]-5-hepten-2-ol ester of the formula

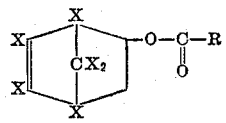

where X is halogen and R is a hydrocarbon radical of from 1 to 20 carbon atoms, with a lower alkyl alcohol in the presence of an esterification catalyst, and isolating from the reaction product a hexahalobicyclo[2.2.1]-5-hepten-2-ol of the formula

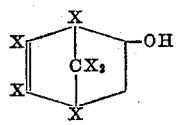

where X is as hereinbefore defined.

14. The method which comprises contacting a hexahalobicyclo[2.2.1]-5-hepten-2-ol of the formula

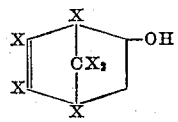

where X is halogen, with a compound selected from the class consisting of hydrocarbon isocyanates and dihydrocarboncarbamyl halides, and isolating from the reaction product a bicycloheptenyl carbamate of the formula

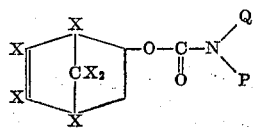

where X is as hereinbefore defined, Q is a hydrocarbon radical, and P is selected from the class consisting of hydrogen and hydrocarbon radicals.

15. The method which comprises contacting hexachlorocyclopentadiene with vinyl acetate and isolating from the reaction product 1,4,5,6,7,7-hexachlorobicyclo[2.2.1]-5-hepten-2-yl acetate.

16. The method which comprises contacting hexachlorocyclopentadiene with vinyl nonanoate and isolating from the reaction product 1,4,5,6,7,7-hexachlorobicyclo[2.2.1]-5-hepten-2-yl nonanoate.

17. The method which comprises contacting hexachlorocyclopentadiene with vinyl benzoate and isolating from the reaction product 1,4,5,6,7,7-hexachlorobicyclo[2.2.1]-5-hepten-2-yl benzoate.

18. The method which comprises contacting 1,4,5,6,7,7-hexachlorobicyclo[2.2.1]-5-hepten-2-yl acetate with ethyl alcohol in the presence of hydrogen chloride and isolating from the reaction product 1,4,5,6,7,7-hexachlorobicyclo[2.2.1]-5-hepten-2-ol.

19. The method which comprises contacting 1,4,5,6,7,7-hexachlorobicyclo[2.2.1]-5-hepten-2-ol with phenyl isocyanate and isolating from the reaction product 1,4,5,6,7,7-hexachlorobicyclo[2.2.1]-5-hepten-2-yl carbanilate.

20. A herbicidal and fungicidal composition comprising an inert carrier and, as the essential effective ingredient a compound of the formula

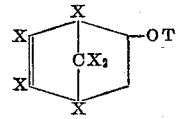

where X is halogen and T is selected from the group consisting of hydrogen, hydrocarboncarbonyl radicals, and hydrocarboncarbamyl radicals.

21. A fungicidal composition containing as the active ingredient, an ester of 1,4,5,6,7,7-hexachlorobicyclo-[2.2.1]-5-hepten-2-ol.

22. A herbicidal composition comprising an inert carrier and, as the essential effective ingredient, 1,4,5,6,7,7-hexachlorobicyclo[2.2.1]-5-hepten-2-ol, of the formula

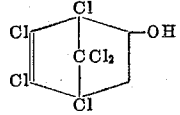

23. The method of destroying plants which comprises applying to said plants a toxic quantity of a herbicidal composition comprising an inert carrier and, as the essential effective ingredient, 1,4,5,6,7,7-hexachlorobicyclo-[2.2.1]-5-hepten-2-ol, of the formula

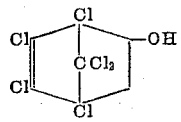

24. The method of preventing plant growth which comprises applying 1,4,5,6,7,7-hexachlorobicyclo[2.2.1]-5-hepten-2-ol, of the formula

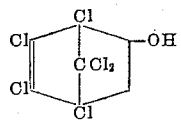

in a quantity which is toxic to plant life, to media normally supporting said growth.

25. The method which comprises contacting a hexahalocyclopentadiene with a vinyl ester of the formula

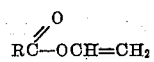

where R is a hydrocarbon radical of from 1 to 20 carbon atoms and thereby forming a hexahalobicyclo[2.2.2]-5-hepten-2-yl ester of the formula

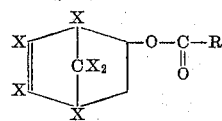

where X is halogen and R is as hereinabove defined, contacting the said hexahalobicyclo[2.2.1]-5-hepten-2-yl ester with a lower alkyl alcohol in the presence of an esterification catalyst, and isolating from the reaction product a hexahalobicyclo[2.2.1]-5-hepten-2-ol of the formula

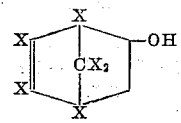

where X is halogen.

(References on following page)

References Cited in the file of this patent

UNITED STATES PATENTS

| | | |
|---|---|---|
| 2,351,311 | Alder et al. | June 13, 1944 |
| 2,471,790 | Sowa et al. | May 31, 1949 |
| 2,736,730 | Kleiman | Feb. 28, 1956 |
| 2,795,619 | Goldman | June 11, 1957 |

FOREIGN PATENTS

| | | |
|---|---|---|
| 83,403 | Netherlands | Oct. 16, 1956 |

OTHER REFERENCES

Prill: Jour. Amer. Chem. Soc., vol. 69 (January 1947), pp. 62–3, 2 pp.

Groggins: "Unit Processes in Organic Synthesis" (4th ed., 1952), page 619, 1 page.

UNITED STATES PATENT OFFICE

Certificate of Correction

Patent No. 2,841,484

July 1, 1958

William K. Johnson

It is hereby certified that error appears in the printed specification of the above numbered patent requiring correction and that the said Letters Patent should read as corrected below.

Column 3, line 59, for "hexahalobicycloheptentol" read *hexahalobicycloheptenol*; column 4, line 42, in the heading to the last column of the table, for "$C_{16}Q_{20}Cl_6O_2$" read *$C_{16}H_{20}Cl_6O_2$*; column 5, line 36, for "-hexachlorocyclobicyclo" read *-hexachlorobicyclo*; column 6, line 64, for "[2,2,1]-" read *[2.2.1]*-; column 12, line 54, for "[2.2.2]-" read *[2.2.1]*-.

Signed and sealed this 3rd day of February 1959.

[SEAL]

Attest:
KARL H. AXLINE,
*Attesting Officer.*

ROBERT C. WATSON,
*Commissioner of Patents.*